(12) United States Patent
Ashlock et al.

(10) Patent No.: US 11,822,622 B2
(45) Date of Patent: Nov. 21, 2023

(54) MACHINE LEARNED FEATURE RECOMMENDATION ENGINE IN A DIGITAL TRANSACTION MANAGEMENT PLATFORM

(71) Applicant: DocuSign, Inc., San Francisco, CA (US)

(72) Inventors: Andrew James Ashlock, San Francisco, CA (US); Ronald Hirson, San Francisco, CA (US); Mark Douglas Belanger, Woodinville, WA (US)

(73) Assignee: DOCUSIGN, INC., San Francisco, CA (US)

( * ) Notice: Subject to any disclaimer, the term of this patent is extended or adjusted under 35 U.S.C. 154(b) by 637 days.

(21) Appl. No.: 16/870,557

(22) Filed: May 8, 2020

(65) Prior Publication Data
US 2021/0350276 A1 Nov. 11, 2021

(51) Int. Cl.
*G06F 18/22* (2023.01)
*G06N 20/00* (2019.01)
*G06N 5/025* (2023.01)
*G06F 18/214* (2023.01)
*G06F 18/21* (2023.01)

(52) U.S. Cl.
CPC .......... *G06F 18/22* (2023.01); *G06F 18/214* (2023.01); *G06F 18/217* (2023.01); *G06N 5/025* (2013.01); *G06N 20/00* (2019.01)

(58) Field of Classification Search
CPC .......... G06N 20/00; G06N 5/025; G06N 3/08; G06K 9/6256; G06K 9/6262; G06K 9/6215; G06K 9/6269
See application file for complete search history.

(56) References Cited

U.S. PATENT DOCUMENTS

| | | | |
|---|---|---|---|
| 7,359,897 B2* | 4/2008 | Singh | G06F 16/168 |
| | | | 707/999.002 |
| 7,970,754 B1* | 6/2011 | Jarboe | G06Q 30/02 |
| | | | 707/706 |
| 9,092,802 B1* | 7/2015 | Akella | G06F 16/36 |

(Continued)

OTHER PUBLICATIONS

United States Office Action, U.S. Appl. No. 16/870,547, dated Jun. 7, 2022, 17 pages.

*Primary Examiner* — Lewis G West
(74) *Attorney, Agent, or Firm* — KDW FIRM PLLC (57) ABSTRACT

An online document system provides a recommendation for one or more features within the online document system to an entity. The online document system accesses a set of feature training data to train a machine learning model. The set of feature training data may describe characteristics of entities associated with the online document system and historical activity associated with the entities' usage of the online document system's features. The machine learning model may be configured to identify a feature to recommend to an entity based on the entity's characteristics and history of using other features within the online document system. For example, data representing the entity's user accounts and use of an electronic signature feature is used by the machine learning model to identify a document authentication feature to recommend to the entity. The online document system may then provide the identified feature in a recommendation to the entity.

20 Claims, 7 Drawing Sheets

(56) References Cited

U.S. PATENT DOCUMENTS

| | | | |
|---|---|---|---|
| 11,487,791 B2* | 11/2022 | Walker | G06N 3/08 |
| 2003/0033287 A1* | 2/2003 | Shanahan | G06F 16/38 |
| 2003/0033288 A1* | 2/2003 | Shanahan | G06F 16/3322 |
| 2003/0061201 A1* | 3/2003 | Grefenstette | G06F 16/93 |
| 2003/0069877 A1* | 4/2003 | Grefenstette | G06F 16/38 |
| 2005/0022114 A1* | 1/2005 | Shanahan | G06F 21/10 |
| | | | 715/234 |
| 2008/0228587 A1* | 9/2008 | Slaney | G06Q 30/0623 |
| | | | 705/26.7 |
| 2010/0082333 A1* | 4/2010 | Al-Shammari | G06F 16/3335 |
| | | | 704/10 |
| 2013/0041909 A1* | 2/2013 | Coleman | H04L 63/102 |
| | | | 707/758 |
| 2014/0379618 A1* | 12/2014 | Chen | G06F 16/93 |
| | | | 706/46 |
| 2015/0310059 A1* | 10/2015 | Assam | G06F 16/24 |
| | | | 707/748 |
| 2016/0029291 A1* | 1/2016 | Khalil | H04W 48/02 |
| | | | 455/26.1 |
| 2018/0203860 A1* | 7/2018 | Mowatt | G06Q 30/016 |
| 2019/0197176 A1* | 6/2019 | Luo | G06F 16/9536 |
| 2019/0332946 A1* | 10/2019 | Han | G06N 5/022 |
| 2020/0210442 A1* | 7/2020 | Bergeron | G06N 20/00 |
| 2020/0320130 A1 | 10/2020 | Korpman et al. | |
| 2021/0089603 A1* | 3/2021 | Abbasi Moghaddam | |
| | | | G06F 16/9535 |
| 2021/0133266 A1* | 5/2021 | Zhang | G06N 20/00 |
| 2021/0350011 A1* | 11/2021 | Ashlock | G06Q 20/4014 |
| 2021/0365807 A1* | 11/2021 | Ramsl | G06F 16/35 |
| 2021/0400008 A1* | 12/2021 | Khan | H04L 51/066 |
| 2021/0406838 A1* | 12/2021 | Ramanath | G06N 20/20 |
| 2022/0058278 A1* | 2/2022 | Hirson | G06F 21/64 |
| 2022/0156631 A1* | 5/2022 | Kanso | G06F 8/60 |
| 2022/0164397 A1* | 5/2022 | Escalona | G06F 16/93 |

* cited by examiner

MACHINE LEARNED FEATURE RECOMMENDATION ENGINE IN A DIGITAL TRANSACTION MANAGEMENT PLATFORM

This disclosure relates generally to an online document system, and more specifically to managing online document system feature accessibility.

BACKGROUND

An online document system provides access to features of the online document system to entities subscribed to use the features. For example, an engineering company is subscribed to use an electronic signature feature and may access it to electronically sign online documents. While the online document system may track information associated with how subscribed entities use features of the online document system (e.g., how frequently features are used and what features are used), the online document system may not have access to information detailing how the features might apply to non-subscribed entities.

This lack of information surrounding non-subscribed entities limits the accuracy of the online document system's feature management, for instance making it more difficult for the online document system to optimize feature recommendations provided to non-subscribed entities. Likewise, this lack of information may prevent potential customers from being reached. Accordingly, an online document system may benefit from having access to feature information associated with non-subscribed entities.

SUMMARY

The online document system described herein implements feature access control with entities associated with the online document system to improve feature management. In particular, the online document system uses feature access control to allow a first entity associated with the online document system (e.g., an entity subscribed to one or more features offered by the online document system, referred to herein as the "subscribed entity" or "parent entity") to sponsor a second entity that does not have access to the features (referred to herein as the "non-subscribed entity" or "child entity") so that the second entity can access features of the online document system. Access policies may be specified by the subscribed entity to set restrictions for the non-subscribed entity's access to sponsored features.

The online document system may obtain information on how entities use features of the online document system to improve feature management. For example, a feature recommendation engine of the online document system may train a machine learning model with the feature use information to improve the accuracy of feature recommendations made by the online document system. The information may also increase a likelihood that non-subscribers convert to subscribers of the online document system, which may provide the online document system with more data about feature usage by the converted entities.

In one embodiment, the online document system provides access to an entity to use a sponsored feature. A first entity (e.g., an engineering company) that is subscribed to the online document system may have access to a first set of features within the system. The online document system receives, from the engineer company, a first request to sponsor a second entity (e.g., an electronics vendor) with access to a second set of features (such as a subset of the first set of features). The online document system may then fulfill the first request by providing the second entity with access to the second set of features. Later, the online document system receives a second request from the engineering company that identifies another feature to sponsor for the second entity. This identified feature may be one that the engineering company has access to but has not yet sponsored the electronics vendor to access. For instance, this identified feature may be included in the first set of features but not included in the second set of features.

Before fulfilling this second request, the online document system determines a first access policy and receives a second access policy from the engineering company. The first access policy is an access policy specified by the online document system that helps govern access to the identified feature. The second access policy is an access policy specified by the engineering company that helps govern access to the identified feature. In this example, both access policies govern whether the electronics vendor can access the identified feature. The policies include requirements that must be satisfied before the electronics vendor can access the identified feature. If the electronics vendor satisfies the requirements, the online document system provides the vendor access to the identified feature.

In another embodiment, the online document system trains and applies a machine learning model to identify one or more features to provide in a recommendation. The online document system accesses a set of feature training data. The feature training data can describe characteristics of entities associated with the online document system and historical activity associated with usage of features within the online document system by those entities. The online document system trains a machine learning model using the accessed set of feature training set. The machine learning model may be configured to identify at least one feature to recommend to a target entity (e.g., the engineering company). The recommendation may be made by the online document system based on characteristics of the target entity and activity associated with the usage of features of the online document system by entities similar to the target entity. The online document system identifies the target entity, for which it is providing a recommendation to, and a second entity associated with the target entity (for instance, through a professional relationship between the first entity and the second entity). The machine learning model is applied to characteristics of the target entity and the second entity to identify features to recommend. The recommended feature may be identified based in part by its popularity with other, similar entities. The online document system then provides the target entity with a recommendation that identifies this popular feature.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
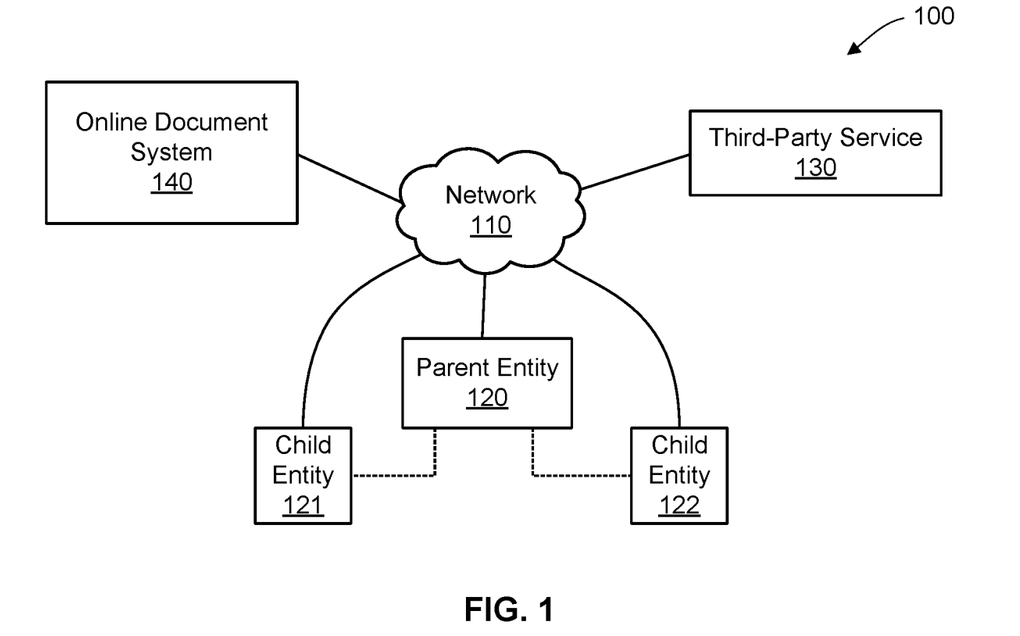
FIG. 1 is a block diagram of a system environment in which an online document system operates, in accordance with at least one embodiment.

FIG. 1 is a block diagram of a system environment 100 in which the online document system 140 operates. The system environment 100 shown by FIG. 1 includes the online document system 140, a parent entity 120, child entities 121 and 122, and a third-party service 130. The system environment 100 may have alternative configurations than shown in FIG. 1, including for example different, fewer, or additional components. For example, an additional parent entity having a child entity may be communicatively coupled with the network 110 to the online document system 140. As another example, the online document system 140 may be communicatively coupled with a remote database storing data for the entities serviced (e.g., storing authorization information for using features of the online document system, documents, or entity profile information). As referred to herein, a "feature" is a service or functionality offered by the online document system 140. The features within the online document system 140 include, for example, features to communicate, edit, authenticate, and/or execute online documents. As referred to herein, an "online document" is an electronic document such as an invoice, contract, sales order, or agreement sent through a communications network (e.g., the network 110).

The system environment 100 described herein can be implemented within the online document system 140, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

The network 110 may serve to communicatively couple the parent entity 120, the child entities 121 and 122, the third-party service 130, and the online document system 140. For example, the online document system 140 and the parent entity 120 are configured to communicate via the network 110. In some embodiments, the network 110 includes any combination of local area and/or wide area networks, using wired and/or wireless communication systems. The network 110 may use standard communications technologies and/or protocols. For example, the network 110 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 110 may be encrypted using any suitable technique or techniques.

The parent entity 120 is an entity using the online document system 140 to communicate documents to or coordinate document activity with other entities (e.g., the child entities 121 and 122). Example entities include a retail business, an Internet retailer, a small business, a bureaucratic agency, an engineering company, an educational institution, a consulting firm, a healthcare provider, a bank, or any suitable combination thereof. As referred to herein, communication with an entity (e.g., a parent entity or a child entity) involves communication with a computing device of the entity, where the computing device is capable of receiving user input as well as transmitting and/or receiving data via the network 110. In some embodiments, the computing device of an entity (e.g., the parent entity 120 and the child entities 121 and 122) is a conventional computer system, such as a desktop or a laptop computer. Alternatively, the computing device may be a device having computer functionality, such as a personal digital assistant (PDA), a mobile telephone, a smartphone, or another suitable device. The computing device is configured to communicate with the online document system 140 via the network 110, for example using a native application executed by the computing device and provides functionality of the online document system 140, or through an application programming interface (API) running on a native operating system of the computing device, such as IOS® or ANDROID™.

The child entities 121 and 122 are entities that use the online document system 140 to communicate documents to or coordinate document activity with the parent entity 120. The child entities 121 and 122 may not be directly subscribed to a feature of the online document system 140 used with the parent entity 120. Features and subscriptions are described in further detail below. In some embodiments, the child entities 121 and 122 may have a professional relationship with the parent entity 120. For example, the child entities 121 and 122 may be business partners with the parent entity 120, may be students of an educational institution represented by the parent entity 120, or may be banking customers of the parent entity 120.

The third-party service 130 may be an entity independent of the online document system 140 and the entities 120, 121, and 122 that provides services to the online document system 140. For example, the third-party service 130 verifies, on behalf of the online document system 140, whether entities are authorized to access features of the online document system 140.

The online document system 140 provides access to features of the online document system to entities associated with the online document system. In some embodiments, a feature is accessible to an entity upon satisfying an access policy. As referred to herein, an "access policy" is at least one requirement that an entity must satisfy to use a feature or features within the online document system 140. The term "access policy" is used interchangeably herein with the term "policy."

For example, the online document system provides the child entity 121 with access to a document authentication feature after the entity provides identity verification to satisfy the access policies established by the online document system and the parent entity 120. In this example, the child entities 121 and 122 may not directly subscribe to the document authentication feature within the online document system 140 but can use the document authentication feature because of sponsorship from the parent entity 120. Access policy creation and verification is described further in the description of FIG. 2. A process to sponsor an entity with access policies is described further in the descriptions of FIGS. 6 & 7. In some embodiments, the online document system 140 provides a GUI to the parent entity 120 to create a sponsorship. Examples of such a GUI are described further in the descriptions of FIGS. 4 and 5.

In some embodiments, the online document system 140 recommends features and access policies. For example, the online document system 140 uses machine learning to determine likely features and/or access policies based on characteristics of an entity. Characteristics of the entity may include profile information about the entity, activity history of the use of the online document system 140 and its features by the entity, or any suitable data related to the association of a feature or access policy to an entity. The training and application of a machine learning model for identifying a recommendation is described further in the description of FIG. 3.

The online document system 140 may recommend features for an entity to use itself or for an entity to use with other entities. A machine learning model may be applied to the parent entity 120's usage of features within the online document system 140 to determine a feature to recommend for the parent entity 120. For example, the online document system 140 uses the parent entity 120's usage of an electronic signature service to identify a related document authentication feature to recommend.

Features can be recommended for an entity to use with other entities as well. The online document system may monitor the entities 120, 121, and 122 and receive data representing the interactions among the entities. A machine learning model may then be applied to the received data to identify a feature to recommend to one or more of the entities for both internal use and use with the other entities.

Online Document System

Figure 2:
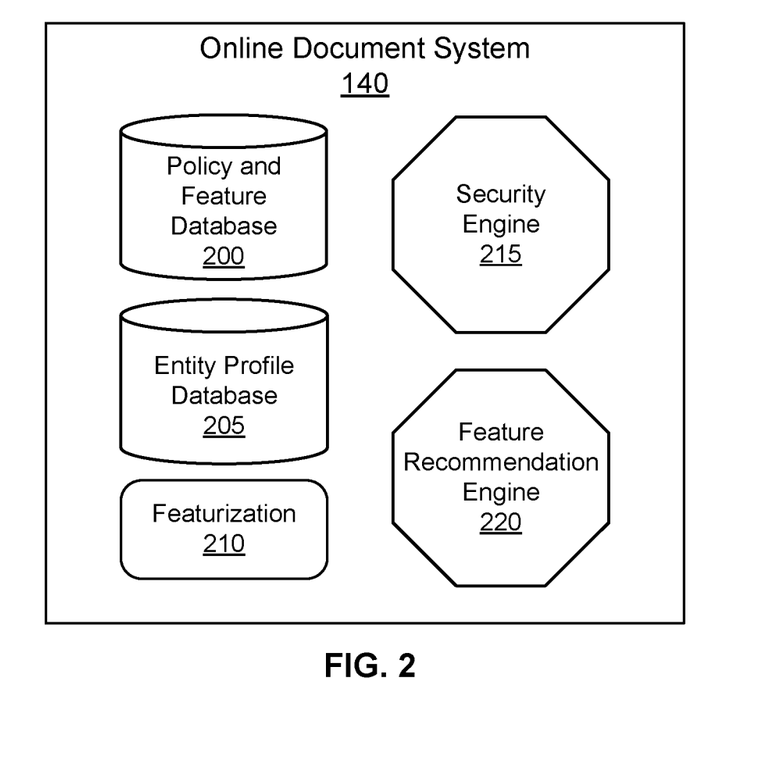
FIG. 2 is a block diagram of the online document system of FIG. 1, in accordance with at least one embodiment.

FIG. 2 is a block diagram of the online document system 140 of FIG. 1. The online document system 140 includes software modules such as a featurization module 210, a security engine 215, and a feature recommendation engine 220. In some embodiments, the online document system 140 includes or accesses local databases such as a policy and feature database 200 and an entity profile database 205. The online document system 140 may have alternative configurations than shown in FIG. 2, including different, fewer, or additional components. For example, at least one of the databases 200 or 205 may be stored remotely and may be accessible through the network 110.

The policy and feature database 200 may include records of access policies available for authorizing an entity to use an available feature and records of the available features. Access policies may be characterized by one or more requirements. For example, an access policy is characterized by a requirement that a child entity use a sponsored feature with a parent entity only. Other examples of requirements include: one or more users of a child entity be whitelisted by the sponsoring parent entity (e.g., through a whitelisted domain address), a child entity use the sponsored feature within a predetermined period of time, the child entity use the sponsored feature no more than a maximum number of times, an identity of a user from the child entity be verified, or any suitable requirement adding security to and/or limiting the use of the sponsored feature.

Policies stored in the policy and feature database 200 may be accessible by the security engine 215 to verify an entity's authorization to use a feature, or by the featurization module 210 to generate a training set for a machine learning model configured to output recommended access policies. In some embodiments, access policies may be specified by both the online document system 140 and an entity (e.g., the parent entity 120). For example, for the child entity 121 to use a sponsored document authentication feature, the security engine 215 determines whether the child entity 121 satisfies an access policy, determined by the online system 140, that the child entity 121 is using the feature with the parent entity 120 and also satisfies an access policy, determined by the parent entity 120, that a user of the child entity 121 provides identity credentials before accessing the feature.

The policy and feature database 200 may also store information associated with features available within the online document system 140, such as an electronic signature service for executing documents, an identity authenticator for accessing and/or executing an online document, a setting configurator for configuring settings of the online document, a supplemental online document provider for attaching supplemental documents in an electronic envelope with an online document, an online document resizer for adapting an aspect ratio of the online document to a device screen size, and the like.

Stored data in the entity profile database 205 includes entity characteristic information and activity history. As referred to herein, "characteristic information" represents characteristics of an entity that is not directly related to the online document system 140 and "activity history" represents activities performed by the entity involving the online document system 140. Characteristic information may include entity types, a type and number of additional entities with which entities interact, applications used by entities to access online documents, whitelisted contacts of the entities for whom respective identities are pre-verified, geographic locations of the entities, a number of employees associated with each entity, a number and type of accounts associated with the online document of each entity, security measures associated with each entity, a trustworthiness associated with each entity, internet protocol (IP) addresses used by computing devices of the entities, hardware attributes of the computing devices of the entities, or any suitable characteristic of an entity that is not directly related to the online document system. For example, an engineering company may be characterized by its number of employees, location, trustworthiness based on a credit rating determined by a credit rating agency, and use of thousands of documents associated with account types such as "staff engineer."

Activity history may include data representing the features used by the entities, a number of the entities using a feature, access policies used by the entities, a frequency with which an entity uses the features, times and durations during which the entity uses the features, monetary values associated with the usage of the features by the entities, sponsorships of the features by the entities on behalf of other entities, any suitable activity performed by the entity involving the online document system, or any combination thereof. For example, the activity history of the engineering company includes a representation of its use of a document execution feature, an average number of times in a day the document execution feature is used, and the fees paid by the engineering company to use the document execution feature.

Figure 4:
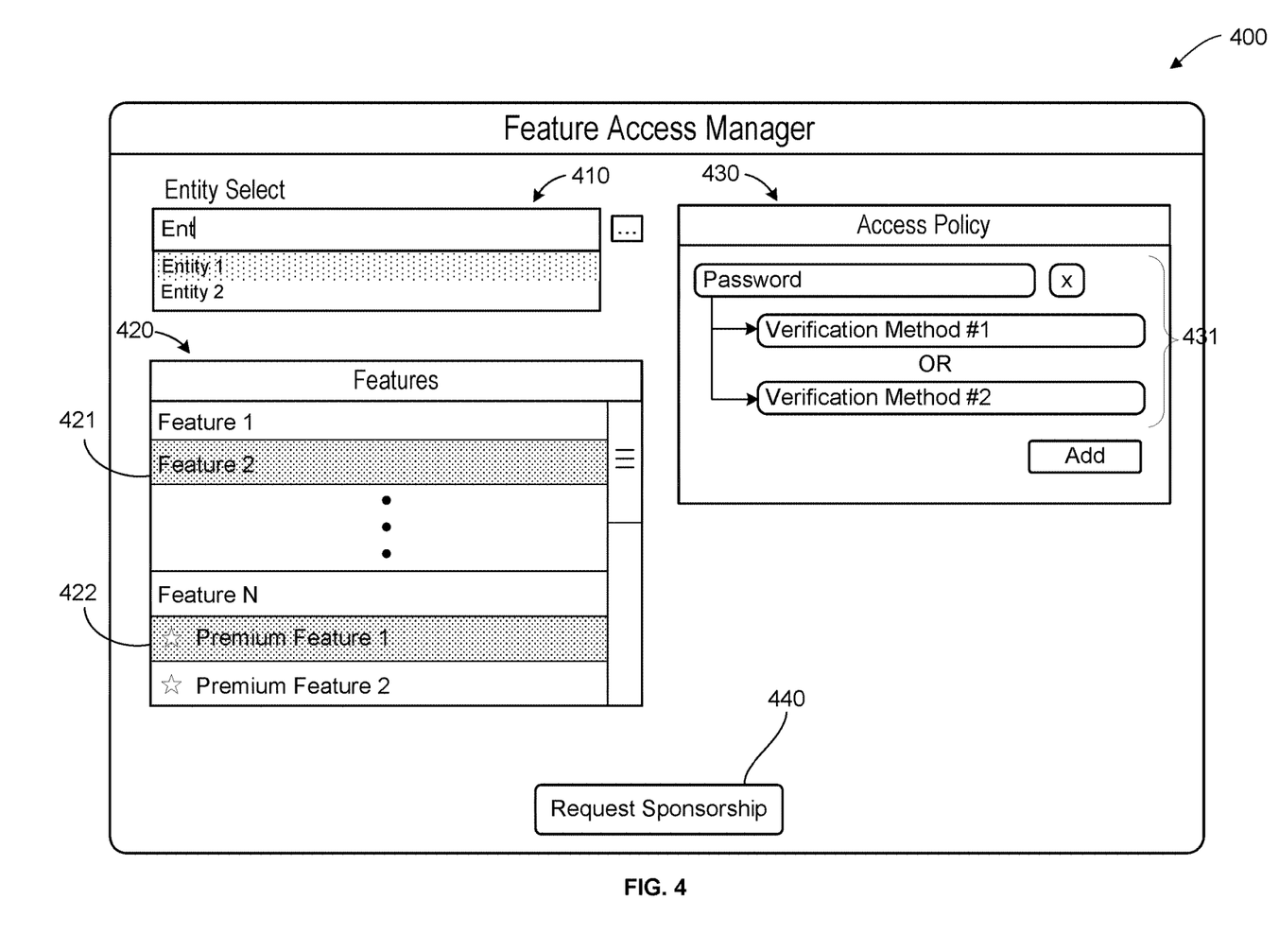
FIG. 4 depicts a graphical user interface (GUI) for requesting access to features within the online document system, in accordance with at least one embodiment.

In some embodiments, entity profile database 205 stores data associations involving at least one of an entity, a feature, and a policy. For example, the entity profile database 205 may have a look-up structure where access policies may be tagged with the entity and/or feature it is used for. Entities may specify sponsored features and a corresponding access policy through the online document system 140 (e.g., through GUI 400) to be stored in the entity profile database 205.

The featurization module 210 encodes data from the databases 200 and 205 for input into a machine learning model. For example, the online document system 140 may provide entity profile information and activity history to the featurization module 210, which generates a mathematical representation of the data. The mathematical representation may be a multi-entry vector (a "feature vector"), with each entry representative of a characteristic of the training data. Each entry of the feature vector may be indicative of a particular data type, data magnitude, data value, or combination thereof. For example, a value of an element representing the number of employees of the parent entity 120 may be the literal number of employees or a number representing the number of the parent entity 120's employees relative to other entities' numbers of employees.

In some embodiments, the featurization module 210 applies weights to training sets or feature vectors input to a machine learning model. For example, the featurization module 210 may determine degrees of similarities between entities and apply weights based on the determined degrees, weighting a more similar entity greater than a less similar entity. In some embodiments, the featurization module 210 reduces the dimensions of a feature vector by replacing multiple vector elements with a weighted sum or average of the element values, which may reduce the number of computations performed by the feature recommendation engine 220. The featurization module 210 may filter a subset of data from databases 200 and 205 to be generated into a feature vector. For example, the featurization module 210 encodes data that has been collected within the past year to improve the likelihood that outputs from the machine learning models reflect recent entity profiles and activity history.

The security engine 215 determines whether an entity satisfies an access policy associated with the use of a feature. The security engine 215 may access the entity profile database 205 to determine one or more access policies specified by the online document system 140 or the parent entity 120 for the child entity 121 to use a sponsored feature. For example, the security engine 215 determines that the parent entity 120's access policy requires that the child entity 121 provide password credentials to use a sponsored electronic signature service. Additionally, the security engine 215 may determine that the online document system 140's access policy requires that the child entity 121 only use the sponsored signature feature with the parent entity 120. The security engine 215 may enforce the system 140's access policy by preventing users without an identification credential (e.g., an email address and/or password) associated with either the parent entity 120 or the child entity 121 from accessing documents modified using the sponsored signature feature. It is noted that an access policy may be further enforced even after a sponsored feature is accessed by an entity and may prevent the feature from being fully utilized until requirements of the access policy are satisfied. The process to verify and provide access to a feature is described further in the description of FIG. 6.

The feature recommendation engine 220 trains and applies a machine learning model to identify one or more features of the online document system 140 to recommend. The online document system 140 accesses data (e.g., in the database 205) representing the usage of features of the online document system by various entities associated with the online document system. The featurization module 210 accesses and encodes this feature usage data stored in the entity profile database 205. To train a machine learning model, the feature recommendation engine 220 accesses this encoded feature usage data to generate a training set. The machine learned model can be trained to identify correlations between the usage of particular features and characteristics of the entities that use the features.

The feature recommendation engine 220 may include multiple machine learning models, the models configured to accept different inputs to generate a feature to recommend. Machine learning models of the feature recommendation engine 220 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, or any suitable supervised or unsupervised learning algorithm.

The identified feature output by the machine learning model may be based on similarities between characteristics of the entity receiving the recommendation and another entity associated with the identified feature. The feature recommendation engine 220 may determine these similarities based on comparisons of entity characteristics. Additionally, or alternatively, the feature recommendation engine 220 may determine similarities based on comparisons of activity history. For example, the feature recommendation engine 220 compares the parent entity 120's company size, the types of accounts associated with the online documents used, and the features it sponsors to similar information of other entities.

In some embodiments, the feature recommendation engine 220 may determine a degree of similarity quantifying the similarities between entities' respective characteristics and/or activity history. The feature recommendation engine 220 may use the determined degrees of similarities between entities to pre-process the feature vectors from the featurization module 210. For example, the feature recommendation engine 220 may determine degrees of similarity representative of the percentage of features sponsored by the parent entity 120 and by other entities. The feature recommendation engine 220 then uses the determined degrees of similarity to filter out or exclude feature vectors associated with entities that have a small degree of similarity from training sets. Additionally, or alternatively, the feature recommendation engine 220 may prioritize entities with larger degrees of similarity by using a training set that includes intentional duplicates of feature vectors associated with those entities.

While the online document system 140 is capable of providing recommendations for many features to an entity, the entity may not have access to sponsor every feature. In some embodiments, the identified feature output by the feature recommendation engine 220 is a feature that an entity has authorization to sponsor. The online document system 140 may limit the number of features that can be sponsored according to a subscription type. For example, the parent entity 120 may have access to a first set of features to sponsor by subscribing to the online document system 140 with a basic account. After subscribing with an advanced subscription account, the parent entity 120 may have access to the first set and an additional second set of features to. As described further in the description of FIG. 5, a particular subscription type may be one requirement for sponsoring a feature.

The identified feature output by the feature recommendation engine 220, in some embodiments, is identified based on features historically sponsored by entities subscribed to the online feature system 140. The feature recommendation engine 220 may provide a recommendation that includes a feature historically sponsored by an entity or currently sponsored by at least a threshold number of entities. For example, the feature recommendation engine 220 prevents features sponsored by less than 5 entities from being recommended and sorts the features that are recommended by the number of entities currently sponsoring them.

In some embodiments, the identified feature output by the feature recommendation engine 220 is a feature that, presently, a first entity has access to and a second entity does not. For example, a machine learning model of the feature recommendation engine 220 outputs a feature that the parent entity 120 has access to and the child entity 121 does not have access to.

The identified feature output by the feature recommendation engine 220, in some embodiments, is identified based on activity history involving a previously recommended feature. For example, the online document system 140 receives usage information indicating that the parent entity 120 is using a previously recommended electronic signature service with the child entity 121. The feature recommendation engine 220 may recommend a document authentication feature to the parent entity 120 based on its previous use of the previously recommended electronic signature service.

In some embodiments, the feature recommendation engine 220 uses activity history involving recommended features as feedback to re-train a machine learning model that outputs recommended features. For example, the feature recommendation engine 220 may strengthen an association between characteristics of the parent entity 120 and a recommended feature responsive to the parent entity 120 accepting the recommendation. Similarly, the feature recommendation engine 220 may weaken an association between characteristics of the parent entity 120 and the recommended feature responsive to the parent entity 120 not accepting the recommendation. The feature recommendation engine 220 may strengthen associations by re-training a machine learning model with updated training sets, generated by the online document system 140, that have an increased number of mappings of a feature vector characterizing an entity (e.g., the parent entity 120) and the recommended feature. Similarly, the feature recommendation engine 220 may weaken associations by re-training a machine learning model with updated training sets, generated by the online document system 140, that do not map or have a decreased number of mappings of a feature vector characterizing an entity (e.g., the parent entity 120) and the recommended feature.

The feature recommendation engine 220 may provide, to an entity, the identified feature output by a machine learning model in a recommendation. As a part of a recommendation generation process, the feature recommendation engine 220 may identify which entity to provide the recommendation to, when to provide the recommendation, and/or a frequency with which to provide recommendations to an entity.

In some embodiments, the feature recommendation engine 220 identifies one or more entities to provide the recommendation to. For example, the feature recommendation engine 220 identifies a parent-child entity pair to recommend the identified feature to at least one entity of the pair. This identification may be performed by accessing the entity profile database 210 to determine an entity that is sponsoring a feature and lookup an entity for whom the feature is sponsored for. The feature recommendation engine 220 may identify entities to provide a recommended feature based on their previous interactions with each other (e.g., records of entity business interactions and/or interactions involving the online document system 140 stored within the entity profile database 205). The feature recommendation engine 220 may target a recommendation for the parent entity 210 and identify the child entity 212 as an additional or alternative entity to provide a recommendation for.

In some embodiments, the feature recommendation engine 220 can identify entities to provide a recommended feature to upon receiving an indication that an entity is requesting a feature to be recommended for use with another entity. Using this indication, the feature recommendation engine 220 may identify both the requesting entity and the entity for whom the request is made. The indication may be received through a GUI provided for display by the online document system 140. For example, a selection of an entity to provide with access to a feature to is an indication of a request communicated to the online document system 140. In some embodiments, information describing restrictions and/or requirements to accessing recommended features are presented in the GUI. An example GUI is described in the description of FIGS. 4 and 5.

In some embodiments, the online document system 140 determines an entity and a time at which to provide a recommendation. An entity's activity history and/or usage of recommended features may be used for this determination. For example, the online document system 140 determines to recommend a document auto-population feature to the parent entity 120 at a time when the parent entity 120 is accessing a document with many text fields. In another example, the online document system 140 may determine a time to provide a recommendation independent of the target entity to which the recommendation is to be provided. For example, the online document system 140 may periodically monitor feature usage across all entities to determine the popularity of features. In turn, the online document system 140 determines the time that a particular feature is popular to recommend a related feature to all entities.

In some embodiments, the feature recommendation engine 220 uses activity history involving recommended features as feedback to modify how it provides recommendations. The feature recommendation engine 220 may determine a quantity and/or frequency at which to provide recommendations based on a frequency with which an entity uses recommended features. For example, responsive to determining that the frequency at which the entity uses recommended features is lower than a threshold frequency, the feature recommendation engine 220 may stop providing recommendations for a threshold period of time.

In some embodiments, the feature recommendation engine 220 may modify how it provides recommendations based on the monetary value with which an entity is spending on features. For example, if the parent entity 120 is spending a monetary value above a threshold value on features of the online document system 140, the feature recommendation engine 220 may increase the frequency with which it provides feature recommendations to the parent entity 120.

Although not depicted in FIG. 2, the online document system 140 may include an access policy recommendation engine. This access policy recommendation engine may identify policies for recommendation or for default use by the online document system 140 and store those identified policies within the policy and feature database 200. While an entity may request a recommended access policy, the output of the access policy recommendation engine may be enforced by default by the online document system 140. A default access policy may be enforced if an entity has not yet specified an access policy.

The access policy recommendation engine may include a machine learning model configured to identify and/or reference an access policy from the policy and feature database 200 to output as a recommendation to an entity. Similar to a machine learning model used in the feature recommendation engine 220, a machine learning model of the access policy recommendation engine may be trained based on historical entity characteristics information and applied to subsequently received entity characteristics information to map the data to an access policy. For example, the access policy recommendation engine is trained using data sets including historical feature usage data and/or data representing characteristics of the entities generating the usage data. The access policy recommendation engine may then receive a feature vector representative of present entity profile information (e.g., currently monitored feature usage data and/or updated characteristics of entities generating the usage data) as input and may map an access policy to entries of the feature vector. The access policy recommendation engine determines, based on the output of the machine learning model, an access policy associated with the entity profile data input to recommend.

In some embodiments, the access policy recommendation engine determines, based on an entity's usage history with features of the system 140, an adjustment to an existing access policy of the entity. The access policy recommendation engine may then provide the adjustment to an existing access policy. For example, the access policy recommendation engine may determine that the child entity 121 is exceeding a threshold request frequency for requesting to use a feature sponsored by the parent entity 120 after a predetermined period of time for granted access has expired. In response, the access policy recommendation engine may use the data representative of the request frequency to determine an access policy with a longer time before granted access to the feature expires (e.g., an additional day).

The access policy recommendation engine may identify policies based on a subscription. The online document system 140 may provide access to premium access policies for entities that have a premium subscription. For example, the parent entity 120 may pay a subscription fee in exchange for a premium access policy that requires an identity be authenticated using a reputed third-party security service.

Figure 3:
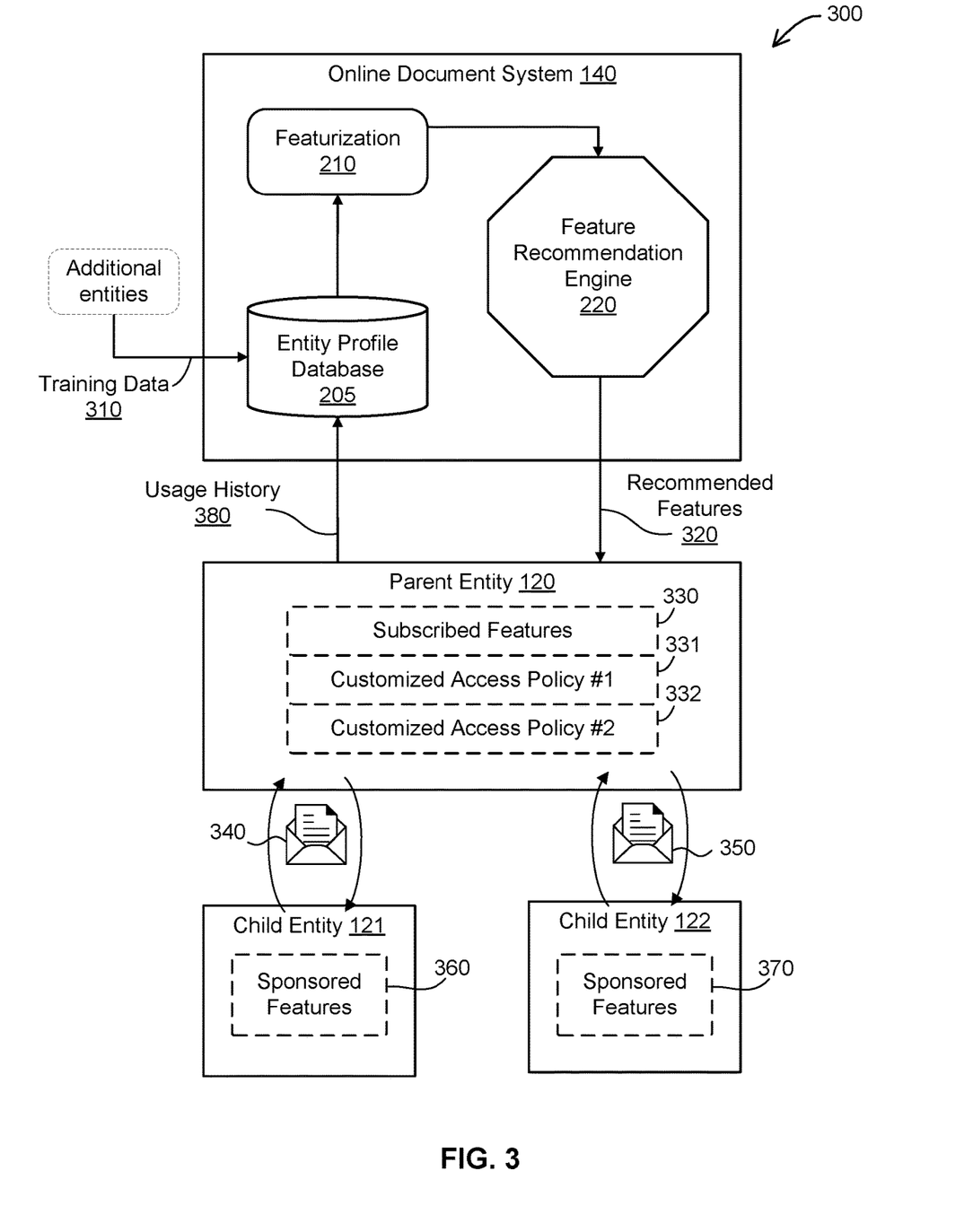
FIG. 3 shows a training and application diagram of the feature recommendation engine of FIG. 2, in accordance with at least one embodiment.

FIG. 3 shows a training and application diagram 300 of the feature recommendation engine 220. The online document system 140 receives training data 310 from entities associated with the online document system 140. To avoid biased outputs, the training data 310 used to recommend features to the entities 120, 121, and 122 may not directly be provided by those entities themselves. The feature recommendation engine 220 determines recommended features 320 based on the received data and provides them to the parent entity 120. The training and application diagram 300 may have alternative configurations than shown in FIG. 3, including different, fewer, or additional components. For example, the recommended features 320 may be provided directly to the child entities 121 and 122.

The parent entity 120 is subscribed to features 330 of the online document system 140 and is associated with customized access policies 331 and 332. The parent entity 120 may communicate electronic envelopes 340 and 350 to the child entities 121 and 122, respectively. These electronic envelopes 340 and 350 can contain online documents associated with the online document system 140 (e.g., edited using or maintained by the online document system 140). The child entities 121 and 122 are sponsored by the parent entity 120 to use features 360 and 370, respectively.

The online document system 140 may store the training data 310 in the entity profile database 205. Although labeled as "training data 310," the data received has not necessarily been prepared or processed for the purposes of training a machine learning model of the online document system 140. Rather, the label "training data 310" includes data in both a pre-processed and processed form that is relied upon to train a machine learning model of the online document system 140. The featurization module 210 may access the training data 310 from the entity profile database 205 to encode into feature vectors for training a machine learning model used by the feature recommendation engine 220.

A usage history 380 of the entities 120, 121, and 122 may be received by the online document system 140 after the machine learning model has been trained. The usage history 380 may include the use of the sponsored features 360 and 370 and the use of the customized access policies 331 and 332. Although not depicted, additional entity characteristic information such as the properties of the online documents communicated within the electronic envelopes 340 and 350 may be communicated to the online document system 140.

The usage history 380 may be stored into the entity profile database 205 and encoded by the featurization module 210. The feature recommendation engine 220 may then input the encoded data into the trained machine learning model of the feature recommendation engine 220 to output the recommended features 320 to the parent entity 120. Although not depicted, an access policy recommendation engine may receive the encoded data for input into a machine learning model trained to output an access policy for recommendation. The recommended access policy may be provided by the online document system 140 to the parent entity 120.

Feature Management Interface

Figure 5:
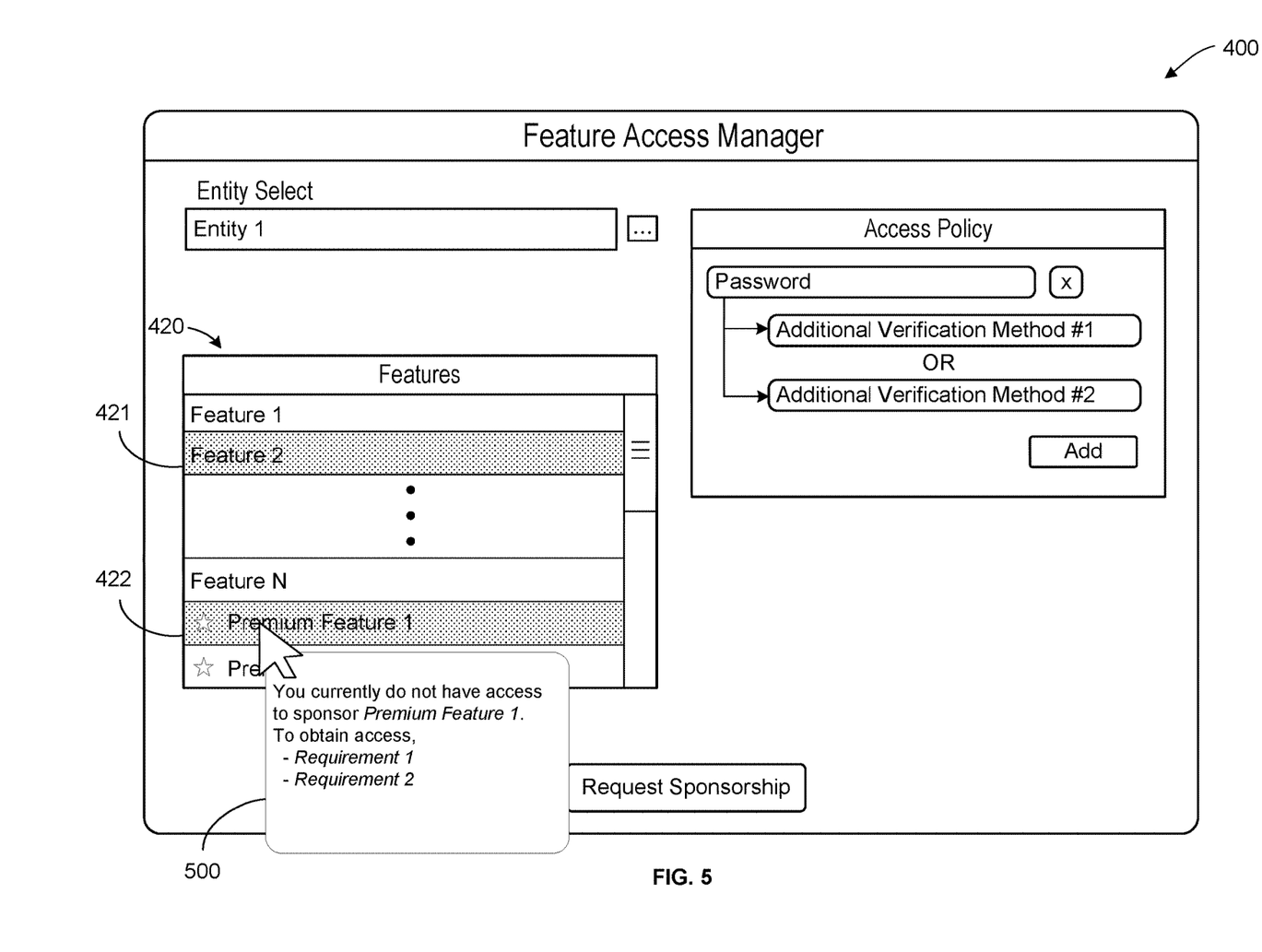
FIG. 5 depicts a notification provided in the GUI of FIG. 4 when requesting access to a feature, in accordance with at least one embodiment.

FIGS. 4-5 depict a GUI 400 for managing access to features within the online document system 140 of FIG. 1. The GUI 400 may be presented to an entity that is requesting to sponsor a feature for another entity. For example, the parent entity 120 may use the GUI 400 to edit which features it is sponsoring for the child entities 121 and 122. In alternative configurations, different and/or additional components may be included in the GUI 400. For example, filtering toggles may be included to sort and/or limit entities, features, or access policies displayed in GUI 400.

The GUI 400 includes an entity selection field 410, a feature list 420, an access policy editing box 430, and a request sponsorship button 440. An entity subscribed to features of the online document system 140 may specify one or more entities for which to sponsor selected features using specified policies. For example, the parent entity 120 may specify the child entity 121 and/or the child entity 122 in the entity selection field 410. The parent entity 120 may then select, from the feature list 420, features to sponsor for the specified entity or entities within the entity selection field 410. The access policy editing box 430 allows the parent entity to create or edit access policies for the specified entity or entities to access the selected features. The GUI 400 may automatically populate with at least one of a recommended entity, feature, or access policy. The parent entity 120 may select the request sponsorship button 440 to transmit the request for sponsorship as defined by the selections made within the GUI 400.

A feature 421 and a premium feature 422 have been selected in the feature list 420. The selection is indicated by the presence of shading within the corresponding text boxes. As referred to herein, a "premium feature" is a feature within the online document system 140 with more access restrictions than other, non-premium features. Requirements to use premium features may include restrictions to particular entity characteristics (e.g., limited to entities located in North America), a minimum duration of subscription with the online document system 140, a premium subscription fee, a promotional code, existing access to one or more specific features, any suitable requirement for using a feature, or any combination thereof. Information regarding access restrictions or requirements associated with premium features may be provided through GUI 400, as described in the description of FIG. 5. The online document system 140 may list available features (e.g., as stored in the policy and feature database 200) in the feature list 420. The online document system 140 may visually distinguish premium features listed in the feature list 420. As depicted in FIG. 4, premium features are visually distinguished using an icon (e.g., a star) next to each premium feature listing. Visual distinguishers are not limited to icons. Differing colors, font sizes, fonts, animations, or any combination thereof may be used to visually distinguish premium features in the GUI 400.

The online document system 140 may automatically populate at least one of the entity selection field 410, the feature list 420, or the access policy editing box 430. The online document system 140 may identify an entity to sponsor a feature for based on the interactions between the parent entity 120 and other entities. The online document system 140 may then populate the entity selection field 410 with this identified entity. The contents of the feature list 420 may be populated based on outputs of the feature recommendation engine 220.

The online document system 140 provides the access policy editing box 430 for the creation or edit of access policies associated with the selected entity in the entity selection field 410 and selected features in the feature list 420. The access policy editing box 430 is depicted with an access policy 431 configured. The access policy 431 is characterized by a password requirement, where the password may be provided through either one of two verification methods (e.g., a user specified password or a temporary password generated by the online document system and provided to a secured user account). The parent entity 120 may select the request sponsorship button 440 to transmit the request for sponsorship as defined by the selections made within the GUI 400.

FIG. 5 depicts a notification provided in the GUI 400 when requesting access to a feature. The GUI 400 of FIG. 4 is depicted with a mouse icon controlled by the parent entity 120 over the premium feature 422 within the feature list 420. Responsive to receiving a selection of the premium feature 422 and/or upon detecting that the mouse icon is hovering over the premium feature 422, the online document system 140 may provide a popup 500 for display. The popup 500 includes information describing restrictions and/or requirements for sponsoring the premium feature 422. For example, the parent entity 120 may be required to subscribe with a premium subscription fee before having access to sponsor the premium feature 422.

Processes for Sponsoring Features Within the Online Document System

Figure 6:
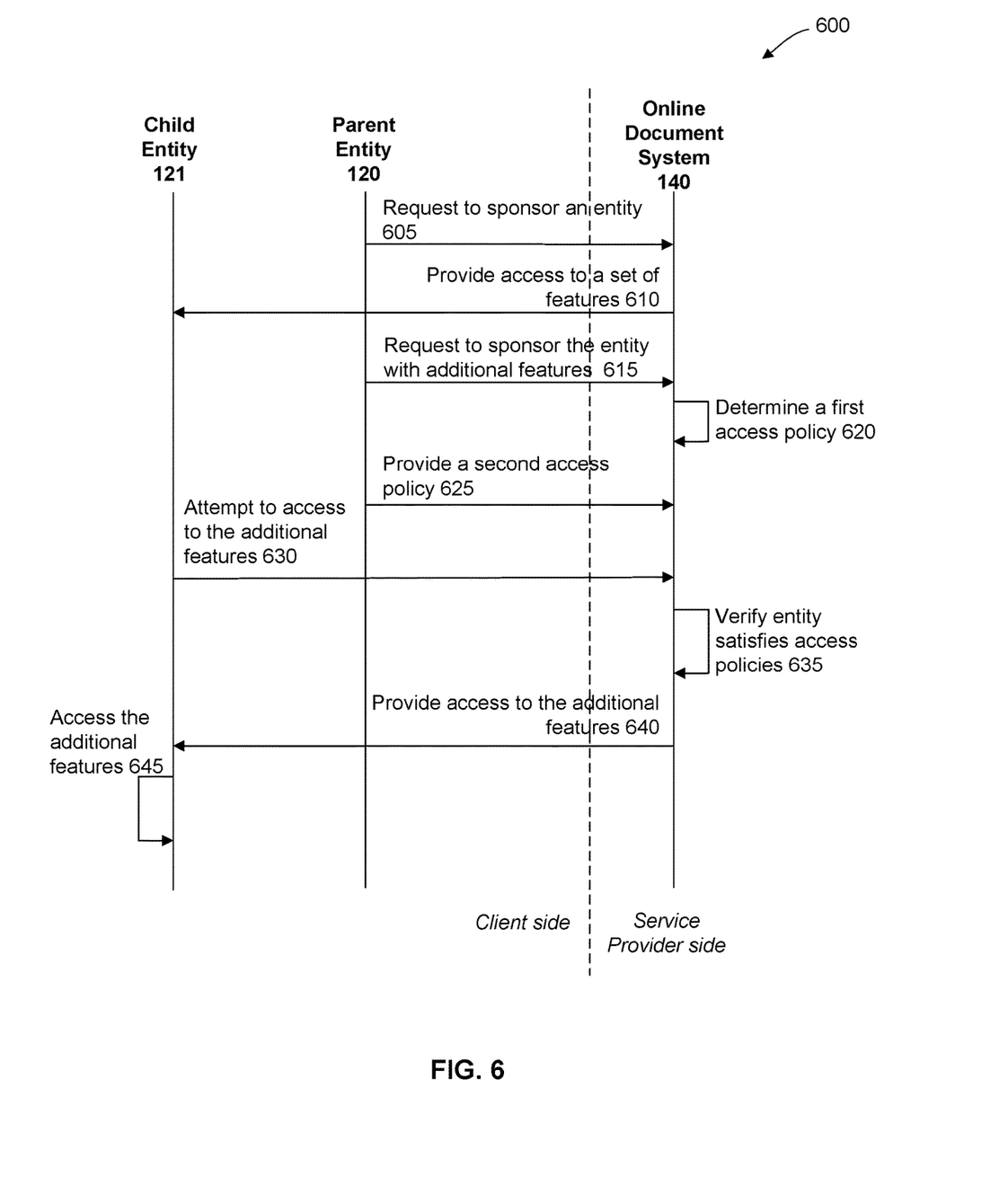
FIG. 6 illustrates the interactions that take place within the system environment of FIG. 1 when providing access to features within the online document system, in accordance with at least one embodiment.

FIG. 6 illustrates an embodiment of interactions 600 that take place within the system environment 100 of FIG. 1 when providing access to features within the online document system 140. The parent entity 120 and the child entity 121 interact with the online document system 140 such that the child entity 121 can access features sponsored by the parent entity 120. When the child entity 121 requests to access sponsored features, the online document system 140 may verify that the child entity 121 satisfies access policies to fulfill the request. The interactions of FIG. 6 may be facilitated by communication over the network 110.

In some embodiments, the interactions illustrated in FIG. 6 involves additional, fewer, or different functions or entities for performing the functions. For example, the third-party service system 130 may interact with the online document system 140 to verify that the child entity 121 satisfies the appropriate access policies. In another example, although the access policy determined by the online document system 140 is depicted as being determined prior to receiving the access policy provided 625 by the parent entity 120, the online document system 140 may receive a policy specified by the parent entity 120 prior to determining its own access policy. In other alternative embodiments, only one of the first or second access policies is determined or no access policy is determined for the child entity 121 to access the additional features.

The parent entity 120 initiates the interactions by requesting 605 to sponsor the child entity 121 to access a set of features. The online document system 140 receives the request and in response, provides 610 the child entity 121 with access to the set of features. For example, the parent entity 120 may request to sponsor electronic signature and document authentication features for the child entity 121. The online document system 140 receives this request and provides the child entity 121 access to the electronic signature and authentication features. Although not depicted between the requesting 605 and the providing 610, one or more access policies may be specified by the parent entity 120 and/or the online document system 140 to enforce when the child entity 121 accesses the features provided 610.

The parent entity 120 later requests 615 to sponsor the child entity 121 to access additional features (such as one or more premium features). The online document system may determine 620 a first access policy and receive a second access policy provided 625 by the parent entity 120. For example, the parent entity 120 requests 615 to sponsor an additional supplemental document feature for the child entity 121 to access. The online document system 140 may determine 620 a first access policy with a requirement that the child entity 121 only use the sponsored supplemental document feature with the parent entity 120. The parent entity 120 provides 625 a second access policy to the online document system 140 that requires that the child entity 121 use the sponsored supplemental document feature prior to a predetermined expiry time (e.g., a month from the request 615).

After the first and second access policies are established, the child entity 121 attempts 630 to access the additional features. The online document system 140 verifies 635 that the child entity 121 satisfies the access policies. After verifying 635 that the child entity 121 has satisfied access policies, the online document system 140 provides 640 access to the additional features. Finally, the child entity 121 accesses 645 the additional features. For example, the child entity 121 may attempt to attach supplemental documents to an electronic envelope, such as an email, using the sponsored feature. The attempt 630 may be in the form of a request from the child entity 121 and received by the online document system 140. Before fulfilling the request, the online document system 140 determines whether the expiry date specified in the second access policy by the parent entity 120 has passed and whether the child entity 121 is sending the electronic envelope to the parent entity 120. When the online document system 140 verifies that the child entity 121 meets the requirements of the first and second access policies, the online document system 140 provides 640 the child entity 121 access to the sponsored feature. The child entity 121 may then receive a confirmation that the supplemental documents were attached to the electronic envelope (e.g., the online document system 140 provides the confirmation).

Although the verifying 635 is depicted as occurring before providing 640 access to the additional features, verifying 635 may, depending on the access policy, be finalized after the child entity 121 accesses the feature. For example, the online document system 140 may allow the child entity 121 to attach supplemental documents using the sponsored feature before determining whether or not the child entity 121 has used the sponsored feature with the parent entity 120.

Figure 7:
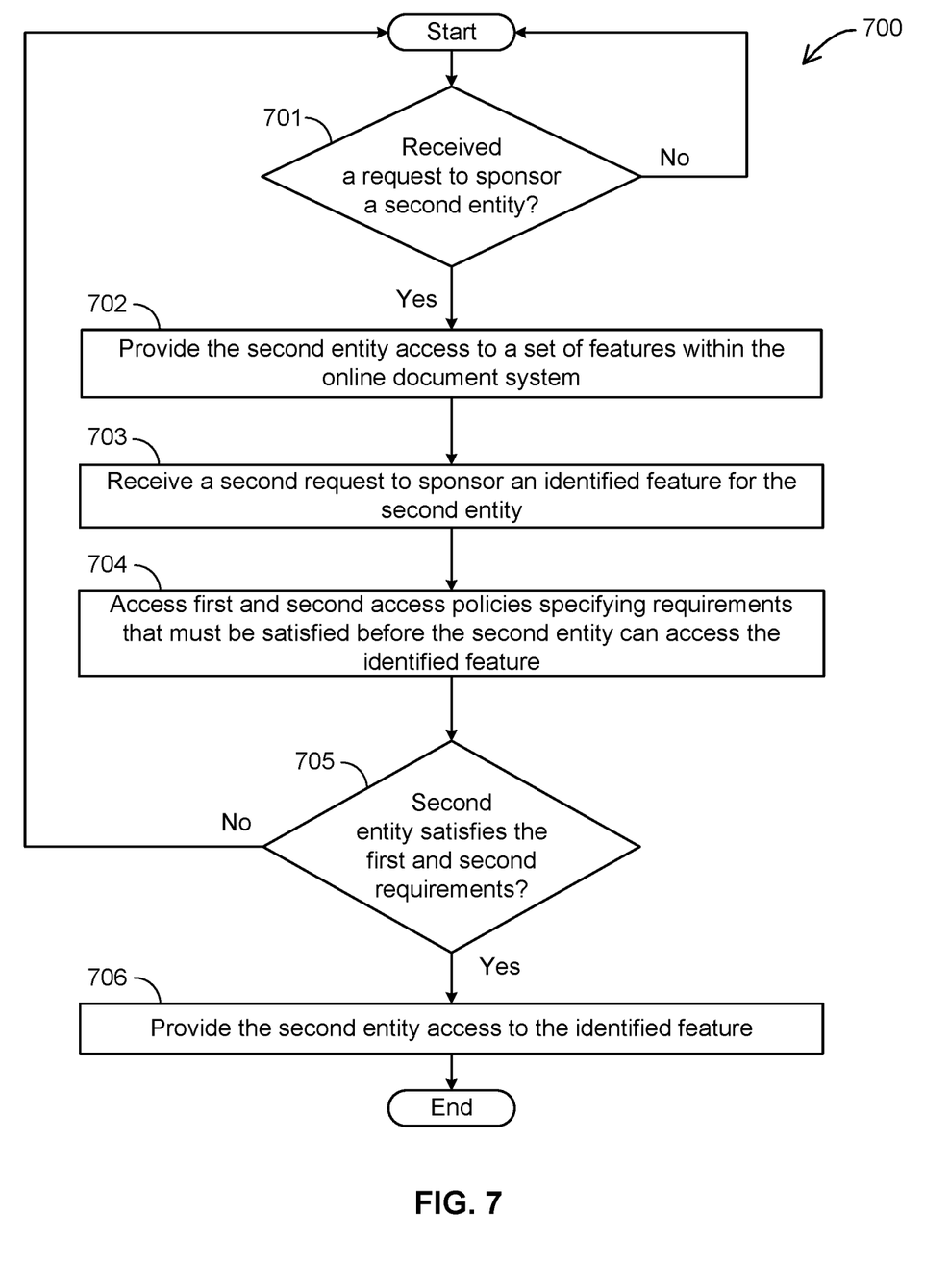
FIG. 7 is a flowchart illustrating a process for providing an entity access to an identified feature, in accordance with at least one embodiment.

FIG. 7 is a flowchart illustrating a process 700 for providing an entity access to an identified feature of the online document system 140. In some embodiments, the online document system 140 performs operations of the process 700 in parallel or in different orders, or performs different steps. For example, although not depicted, the process 700 may include determining an access policy for providing access to the set of features before providing 702 access to those features.

The online document system 140 determines 701 whether it has received a request from a first entity to sponsor a second entity. For example, the online document system 140 may determine whether it has received a request from the parent entity 120 to sponsor the child entity 121. If the online document system 140 determines it has not received the request, the process 700 will not proceed to providing 702 access to a set of features and may repeat the determination 701 of whether it has received a request to sponsor an entity. If the online document system 140 determines it has received the request to sponsor a second entity, the process 700 continues. For example, the online document system 140 may receive a user selection of the request sponsorship button 440 of the GUI 400, indicating that an entity is requesting to sponsor a set of features.

The online document system 140 provides 702 access to a set of features within the online document system 140. For example, the online document system 140 provides the child entity 121 access to a set of features that the parent entity 120 has requested to sponsor. The set of features may be selected from features that the parent entity 120 has access to. For example, the parent entity 120, through its subscription to the services of the online document system 140, has access to electronic signature and document authentication features and can request that the online document system 140 provide access to those features for the child entity 121 via sponsorship.

The online document system 140 receives 703 a second request to sponsor an identified feature for the second entity. For example, the parent entity 120 transmits another request to the online document system 140 to sponsor a feature it has not yet sponsored for the child entity 121. The parent entity 120 may use the GUI 400 to request the sponsorship of a premium document auto-population feature for which it meets requirements to sponsor. For example, a popup similar to the popup 500 may not appear to notify the parent entity 120 as it attempts to sponsor the premium document auto-population feature because it meets the requirement of paying a premium subscription fee.

The online document system 140 accesses 704 first and second access policies including requirements that must be satisfied before the second entity can access the identified feature. The online document system 140 may determine the first access policy for the parent entity 120's request to sponsor the document auto-population feature. For example, the online document system 140 may determine an access policy including the requirement that the child entity 121 only use the document auto-population feature with the entity that sponsored the feature, the parent entity 120. This determination can be made using the access policy recommendation engine as described herein. In other embodiments, the first access policy may be a default access policy used for all features or this specific feature. The parent entity 120 may determine the second access policy. For example, the parent entity 120 may provide an access policy to the online document system 140 using the GUI 400. The second access policy may specify a requirement that the child entity 121 use the document auto-population feature within one month of the date on which the sponsorship was requested.

The online document system 140 determines 705 whether the second entity satisfies both the first and second requirements. For example, the online document system 140 determines whether the child entity 121 meets the first access policy requiring that the document auto-population feature only be used with the parent entity 120 and whether the child entity 121 meets the second access policy requiring that the document auto-population feature be used before a predetermined expiry date. If the child entity 121 does not satisfy the requirements of both access policies, the process 700 may not continue, and if the child entity 121 satisfies the requirements of both access policies, the process 700 continues.

The online document system 140 provides 706 the second entity access to the identified feature. After the child entity 121 has satisfied both access policies, it may access the document auto-population feature. The online document system 140 may provide a confirmation that access was granted. For example, the online document system 140 may begin automatically populating fields of an online document in accordance with the functionality of the document auto-population feature. As another example, the online document system 140 may provide a message (e.g., an email) to the child entity 121 indicating that the online document with automatically populated fields was successfully sent to the parent entity 120.

Figure 8:
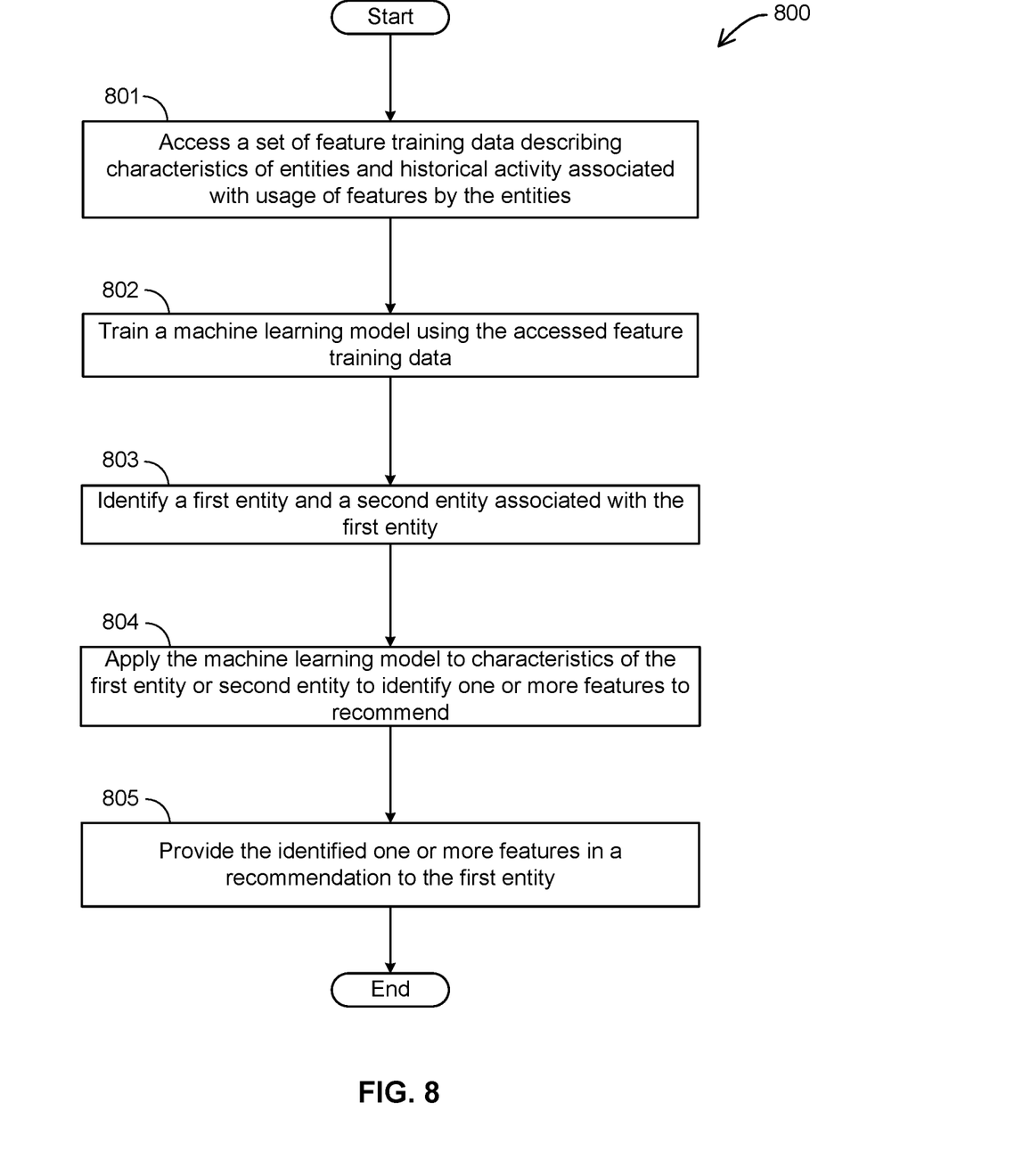
FIG. 8 is a flowchart illustrating a process for recommending a feature to an entity, in accordance with at least one embodiment.

FIG. 8 is a flowchart illustrating a process 800 for recommending a feature of the online document system 140 to an entity. In some embodiments, the online document system 140 performs operations of the process 800 in parallel or in different orders, or may perform different steps. For example, although not depicted, the process 800 may include receiving data describing updated characteristics of entities and subsequent activity between entities before applying 804 the machine learning model to identify one or more features to recommend.

The online document system 140 accesses 801 a set of feature training data describing characteristics of entities and historical activity associated with usage of features by the entities. In some embodiments, the online document system maintains data representative of entity characteristics and historical activity within the entity profile database 205.

The online document system 140 trains 802 a machine learning model using the accessed 801 feature training data. The data maintained in entity profile database 205 may be accessed for training 802 a machine learning model (e.g., of the feature recommendation engine 220). Although not depicted in the process 800, the featurization module 210 may be used to encode the data into suitable and/or standardized data prior to training 802 the machine learning model.

The online document system 140 identifies 803 a first entity and a second entity associated with the first entity. In some embodiments, the online document system 140 identifies entities using activity history between entities. For example, the online document system 140 may identify the parent entity 120 and subsequently identify the child entity 121 because records within the entity profile database 205 indicate that the parent entity 120 has sent an online document to the child entity 121. In some embodiments, the online document system 140 receives an indication from the parent entity 120 that it intends to sponsor features for the child entity 121.

The online document system 140 applies 804 the machine learning model to characteristics of the first entity or second entity to identify one or more features to recommend. For example, the online document system 140 applies the trained machine learning model from the training 802 to entity characteristics of the parent entity 120 and/or the child entity 121 to identify a premium document auto-population feature to recommend. In this example, the online document system 140 may monitor the number of fields within online documents communicated between the parent entity 120 and the child entity 121 to determine that at least a threshold number of documents communicated have fields that may be auto-populated using the premium document auto-population feature. The machine learning model of the feature recommendation engine 220 may be trained to map the document auto-population feature to entity characteristics representative of these monitored interactions.

The online document system 140 provides 805 the identified one or more features in a recommendation to the first entity. In some embodiments, the online document system 140 provides the recommendation through a GUI (e.g., the GUI 400).

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
accessing, by an online document system, a set of feature training data describing characteristics of entities associated with the online document system and historical activity associated with usage of features within the online document system by the entities;
training, by the online document system, a machine learning model using the accessed set of feature training data, the machine learning model configured to identify, for a target entity, at least one feature to recommend to the target entity based on characteristics of the target entity and activity associated with the usage of features of the online document system by entities similar to the target entity, the at least one feature being identified based on a number of mappings between the characteristics of the target entity and the features;

identifying, by the online document system, a first entity and a second entity associated with the first entity;

applying, by the online document system, the machine learning model to characteristics of the first entity or second entity to identify one or more features to recommend; and providing, by the online document system, the identified one or more features in a recommendation to the first entity.

2. The method of claim 1, wherein the historical activity associated with usage of features within the online document system comprises data representing one or more of: the features used by the entities, a number of the entities using a feature, access policies used by the entities, a frequency with which an entity uses the features, times and durations during which an entity uses the features, monetary values associated with the usage of the features by the entities, and sponsorships of the features by the entities on behalf of other entities.

3. The method of claim 1, wherein the characteristics of entities include one or more of: a type of each entity, a type and number of additional entities with which the entities interact, applications used by entities to access online documents, whitelisted contacts of the entities for whom respective identities are pre-verified, geographic locations of the entities, a number of employees associated with each entity, a number and type of accounts associated with the online document of each entity, security measures associated with each entity, and a trustworthiness associated with each entity.

4. The method of claim 1, wherein identifying the first entity and the second entity comprises receiving an indication that the first entity requests a feature be recommended for use with the second entity.

5. The method of claim 1, wherein identifying the first entity and the second entity comprises identifying the first entity is using features of the online document system with the second entity.

6. The method of claim 1, wherein the identified one or more features to recommend comprises one or more of: an electronic signature service, an identity authenticator for accessing an online document, a setting configurator for configuring settings of the online document, a supplemental online document provider, or an online document resizer for adapting an aspect ratio of the online document to a device screen size.

7. The method of claim 1, wherein the online document system is configured to provide the second entity access to a feature within the online document system responsive to the first entity requesting to sponsor the feature and the second entity satisfying a plurality of requirements.

8. The method of claim 7, wherein the plurality of requirements include one or more of: a user from the second entity matches a whitelisted user of a plurality of whitelisted users selected by the first entity, an identity of the user from the second entity is verified, the second entity uses the feature within a predetermined period of time, the second entity uses the feature no more than a maximum number of times, and the second entity uses the feature to interact with the first entity.

9. The method of claim 1, further comprising determining, based on a comparison of characteristics of the similar entities and the target entity and/or a comparison of activity associated with the usage of features of the online document system by the similar entities and the target entity, a degree of similarity between the similar entities and the target entities.

10. The method of claim 1, further comprising re-training the machine learning model based at least in part on subsequent actions by one or more of the first entity and the second entity.

11. The method of claim 10, wherein re-training the machine learning model comprises:

strengthening an association between characteristics of the first entity and the identified one or more features in response to the first entity accepting the recommendation; and weakening the association between the characteristics of the first entity and the identified one or more features in response to the first entity not accepting the recommendation.

12. The method of claim 1, wherein the identified one or more features comprise a feature available to the first entity for sponsoring on behalf of the second entity.

13. The method of claim 1, wherein the identified one or more features comprise a feature sponsored by a plurality of entities.

14. The method of claim 1, wherein the identified one or more features comprise a feature that the first entity is authorized to use and the second entity is not yet authorized to use.

15. The method of claim 1, wherein the identified one or more features comprises a feature sponsored on behalf of at least a threshold number of entities.

16. The method of claim 1, wherein providing the identified one or more features in the recommendation comprises:

providing, for display on a computing device of the first entity, an interface, the interface configured to:

provide information related to requirements and restrictions for using the identified one or more features; and providing access to the one or more features in response to receiving a user selection of the one or more features.

17. The method of claim 1, further comprising:

determining, based on activity associated with the usage of features of the online document system by the first entity, a time that the first entity is likely to accept the recommendation; and providing the recommendation at the determined time.

18. The method of claim 1, further comprising:

in response to the first entity accepting the recommendation, monitoring, by the online document system, usage of the identified one or more features by the first entity or the second entity;

applying, by the online document system, the machine learned model to the monitored usage of the identified one or more features to identify an additional feature to recommend; and providing, by the online document system, the additional feature in a second recommendation to the first entity.

19. An online document system comprising a non-transitory computer-readable storage medium storing instructions for execution and a hardware processor configured to execute the instructions, the instructions, when executed, cause the hardware processor to perform steps comprising:

accessing a set of feature training data describing characteristics of entities associated with the online document system and historical activity associated with usage of features within the online document system by the entities;

training a machine learning model using the accessed set of feature training data, the machine learning model configured to identify, for a target entity, at least one feature to recommend to the target entity based on characteristics of the target entity and activity associated with the usage of features of the online document system by entities similar to the target entity, the at least one feature being identified based on a number of mappings between the characteristics of the target entity and the features;

identifying a first entity and a second entity associated with the first entity;

applying the machine learned model to characteristics of the first entity or second entity to identify one or more features to recommend; and providing, by the online document system, the identified one or more features in a recommendation to the first entity.

20. A non-transitory computer readable storage medium storing executable instructions that, when executed by one or more processors, cause the one or more processors to perform steps comprising:

accessing a set of feature training data describing characteristics of entities associated with the online document system and historical activity associated with usage of features within the online document system by the entities;

training a machine learning model using the accessed set of feature training data, the machine learning model configured to identify, for a target entity, at least one feature to recommend to the target entity based on characteristics of the target entity and activity associated with the usage of features of the online document system by entities similar to the target entity, the at least one feature being identified based on a number of mappings between the characteristics of the target entity and the features;

identifying a first entity and a second entity associated with the first entity;

applying the machine learned model to characteristics of the first entity or second entity to identify one or more features to recommend; and providing the identified one or more features in a recommendation to the first entity.

* * * * *